United States Patent
Roberts et al.

(10) Patent No.: US 7,630,316 B2
(45) Date of Patent: Dec. 8, 2009

(54) METHOD AND APPARATUS FOR SELECTING A TRANSPORT FORMAT COMBINATION

(75) Inventors: Gideon Edmund Roberts, Stone (GB); Egil Hjelmeland, Trondheim (NO); Ingunn Skogstad Oksas, Trondheim (NO); Hege Knotten, Trondheim (NO)

(73) Assignee: Research In Motion Limited, Waterloo (CA)

( * ) Notice: Subject to any disclaimer, the term of this patent is extended or adjusted under 35 U.S.C. 154(b) by 528 days.

(21) Appl. No.: 11/026,456

(22) Filed: Dec. 30, 2004

(65) Prior Publication Data

US 2006/0146833 A1   Jul. 6, 2006

(51) Int. Cl.
   *H04L 12/28* (2006.01)
(52) U.S. Cl. .............................. 370/236.1; 370/395.42; 370/469
(58) Field of Classification Search .................. 370/338, 370/395.42, 458, 468, 349; 455/453, 434, 455/452.1
See application file for complete search history.

(56) References Cited

U.S. PATENT DOCUMENTS

2002/0085531 A1* 7/2002 Herrmann et al. ........... 370/338
2005/0025159 A1* 2/2005 Lee et al. ................ 370/395.42

FOREIGN PATENT DOCUMENTS

| EP | 1 206 083 A2 | 5/2002 |
| EP | 1 349 332 A1 | 10/2003 |
| GB | 2 401 760 A | 11/2004 |
| WO | WO 01/63855 A1 | 8/2001 |
| WO | WO 2004/111875 A2 | 12/2004 |

OTHER PUBLICATIONS

European Search Report; European Patent Office; Jun. 1, 2005; 10 pages.

* cited by examiner

*Primary Examiner*—Seema S. Rao
*Assistant Examiner*—Henry Baron
(74) *Attorney, Agent, or Firm*—The Danamraj Law Group, P.C.

(57) ABSTRACT

A method for selecting a transport format combination used in a wireless communication network for multiplexing data between logical channels and transport channels. After receiving a configuration table with logical and transport channel information, a transport format selection mechanism prioritizes each transport channel and sorts the transport formats according to priority and minimum buffer occupancy. The transport format selection mechanism selects a transport format combination by comparing the logical channel size with the minimum and maximum buffer occupancy of each sorted transport format associated with a transport channel that are also associated with the logical channel in such a manner as to not exceed logical channel size restrictions so that a transport format combination can be selected having a transport format of the most compatible size.

23 Claims, 3 Drawing Sheets

METHOD AND APPARATUS FOR SELECTING A TRANSPORT FORMAT COMBINATION

TECHNICAL FIELD

The present invention relates, in general, to the field of Medium Access Control (MAC) mechanisms in wireless communication networks, and, in particular, to a method and apparatus for selecting a Transport Format Combination (TFC).

BACKGROUND

In wireless communication networks, a mobile device and a Radio Access Network (RAN) in a synchronized session coordinate the flow of control and user data, such as transmission control, text, voice, image, and video data, through the wireless network to and from other communication devices through either other wireless communication networks, a Public Switched Telephone Network (PSTN), or a Packet Data Switching Network (PDSN). Mobile devices have evolved into complex computing machines offering a wide variety of services comparable to that of personal computers. Therefore, the concentration of data the mobile device and the RAN must process in a synchronized fashion has increased significantly. The processing mechanisms used in the mobile devices and the RAN typically have greater processing responsibilities when compared to computers within a land line based network considering the sensitivity of the radio link connecting the mobile device and the RAN. Therefore, considering the extension of wireless services and the additional process control procedures required to compensate this sensitivity, processing inefficiencies can result in increased power consumption, delays, inefficient use of the radio link, and disrupted services.

In particular with respect to the mobile device and the RAN, a Medium Access Control (MAC) mechanism provides logical channels to a Radio Link Control (RLC) mechanism in order to multiplex data units from the logical channels onto transport channels provided by a physical layer mechanism so that the physical layer mechanism can code the data units into data frames in order to transmit the data over a physical channel. The MAC mechanism provides a complex service for the RLC mechanism by selecting from an extensive table of information a Transport Format Combination (TFC) identifying Transport Formats (TF) for each transport channel within each Transmission Time Interval (TTI). This complicated process within a short period of time requires extensive processing power, and in the case of the mobile device excessive processing power, that still may not prevent delay and processing failures.

Therefore, there is a need to streamline processing procedures in order to facilitate complex processing procedures.

SUMMARY

To overcome limitations identified within the background, a method and apparatus are provided for selecting transport format combination in a Medium Access Control (MAC) mechanism.

In an embodiment, a TFC selection mechanism is provided for selecting a transport format combination utilized in a mechanism of a wireless communication network for multiplexing data units between logical channels and transport channels. Upon receiving a configuration table comprising information identifying at least one logical and transport channel, a transport format set, and a transport format combination set, the TFC selection mechanism prioritizes and sorts the configuration table so that upon the presence of data at a logical channel the TFC selection mechanism can select the most compatible transport format combination in the most efficient manner possible in the transmission time interval of a transmission frame.

In the embodiment, the TFC selection mechanism upon receiving the channel configuration table prioritizes each transport channel, sorts the at least one transport format according to a minimum buffer occupancy of each transport format associated with each prioritized transport channel; wherein associated with each sorted transport format is a minimum and maximum buffer occupancy, and at least one transport format combination which use a transport format of a size equal to or less than the maximum buffer occupancy. The TFC selection mechanism further sorts the transport channels according to increasing transmission time interval, and sorts the logical channels according to increasing transmission time interval and decreasing priority for each logical channel.

In the embodiment, the TFC selection mechanism, upon the presence of data units having a logical channel size at a logical channel, compares the transmission time interval of the transport channel associated with the logical channel with the transmission time interval of a current frame available for transmission to determine if transmission is possible. If transmission is possible, the TFC selection mechanism selects a transport format combination by comparing the logical channel size with the minimum and maximum buffer occupancy of each sorted transport format associated with a transport channel associated with the logical channel, wherein each sorted transport format has associated therewith at least one transport format combination identified as not exceeding logical channel size restrictions so that a transport format combination having at least one transport format of the most compatible size can be selected.

DETAILED DESCRIPTION

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention.

A Transport Format Combination (TFC) selection mechanism utilized in a Medium Access Control (MAC) mechanism for efficiently providing a TFC identifying Transport Formats (TF) used for multiplexing data units onto transport channels is presented. The MAC mechanism upon channel configuration either by session initialization or a data rate update during a session receives logical and transport channel configuration tables. The logical channel configuration table, see Table 1 below as an exemplary illustration, may comprise information such as Radio Bearer (RB) mapping and identification information, logical channel identification information, logical channel priority information, RLC data unit size restrictions, and Dedicated Channel (DCH) identification information.

TABLE 1

|  | RB map index | | | | |
| --- | --- | --- | --- | --- | --- |
|  | 2 | 4 | 8 | 6 | 10 |
| RB id | 13 | 15 | 19 | 17 | 21 |
| Logical Channel ID | 11 | 9 | 13 | 11 | 14 |
| Priority | 8 | 2 | 3 | 4 | 1 |
| RLC-size restrict | all | all | 1 | 2 | all |
| DCH id | 3 | 5 | 5 | 5 | 7 |

The transport channel configuration table, see Table 2A, 2B, and 2C below as an exemplary illustration, comprises information such as transport channel identification information, DCH identification information, Transmission Time Interval (TTI), see Table 2A below, Transport Format Sets (TFS), and Transport Format Combination Sets (TFCS). The TFS comprises the Transport Formats (TF), which identifies Transport Block (TB) sizes and number of TB for each transport channel, see Table 2B below. The TFCS identifies the Transport Format Combination's (TFC) that identifies the TF for each transport channel, see Table 2C below.

TABLE 2A

| 40 ms | 20 ms | 80 ms |
| --- | --- | --- |
| DCH3 | DCH5 | DCH7 |
| TrCh1 | TrCh2 | TrCh3 |

TABLE 2B

| TFS1 | TFS2 | TFS3 |
| --- | --- | --- |
| $TF_{1,1}$ (32, 0) | $TF_{2,1}$ (40, 2) | $TF_{3,1}$ (320, 0) |
| $TF_{1,2}$ (32, 1) | $TF_{2,2}$ (40, 1) | $TF_{3,2}$ (320, 1) |
| $TF_{1,3}$ (32, 2) | $TF_{2,3}$ (40, 0) | |
| | $TF_{2,4}$ (45, 1) | |

TABLE 2C

| TFCS | TrCh1 | TrCh2 | TrCh3 |
| --- | --- | --- | --- |
| TFC1 | $TF_{1,1}$ | $TF_{2,3}$ | $TF_{3,1}$ |
| TFC2 | $TF_{1,2}$ | $TF_{2,3}$ | $TF_{3,1}$ |
| TFC3 | $TF_{1,1}$ | $TF_{2,2}$ | $TF_{3,1}$ |
| TFC4 | $TF_{1,3}$ | $TF_{2,1}$ | $TF_{3,1}$ |
| TFC5 | $TF_{1,2}$ | $TF_{2,2}$ | $TF_{3,1}$ |
| TCF6 | $TF_{1,1}$ | $TF_{2,3}$ | $TF_{3,2}$ |

Figures 1A, 1B:
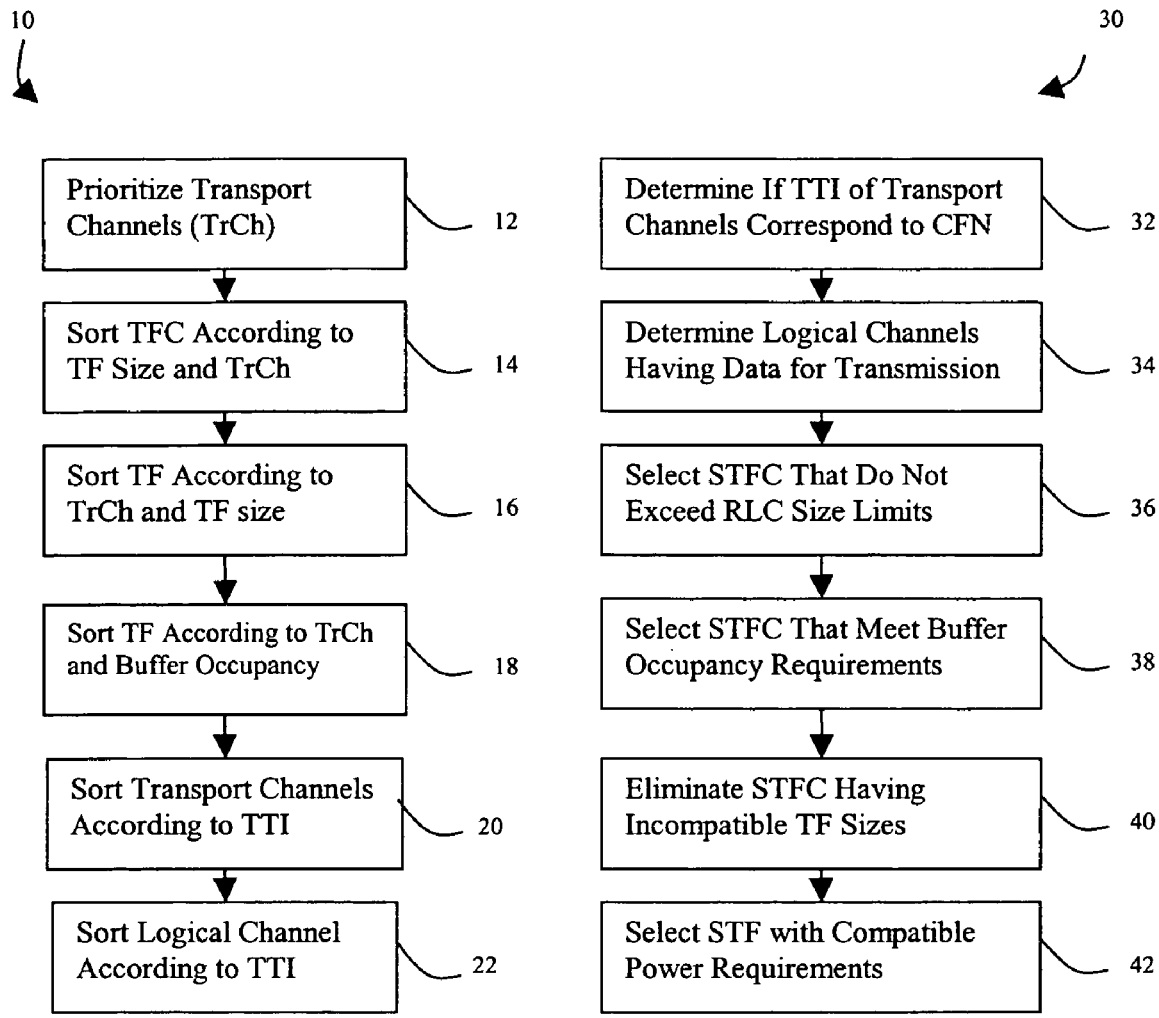
FIG. 1A illustrates the process steps associated with sorting the logical and transport channel tables according to different parameters to provide a more efficient TFC selection process.
FIG. 1B illustrates the process steps associated with selecting an appropriate TFC using the sorted tables upon the presence of data units available for transport between logical and transport channels.

In FIGS. 1A and 1B, the process flow steps associated with the TFC selection mechanism are illustrated and denoted generally as 10 and 30 respectively. Specifically, FIG. 1A illustrates the process steps associated with sorting the logical and transport channel tables according to different parameters to provide a more efficient TFC selection process. FIG. 1B illustrates the process steps associated with selecting an appropriate TFC using the sorted tables upon the presence of data units available for transport between logical and transport channels.

In FIG. 1A, at step 12 upon receipt of the configuration tables the TFC selection mechanism prioritizes the transport channels according to the priority of the logical channels, for example TrCh3 maybe assigned the highest priority, TrCh2 medium priority, and TrCh1 low priority. Next, at step 14, the TFC selection mechanism creates a sorted TFC table comprising TFC sorted according to TF size and transport channel priority, see Table 3 below.

TABLE 3

| STFCS | TFCS | TrCh3 (Pri High) | TrCh2 (Pri Med.) | TrCh1 (Pri Low) |
| --- | --- | --- | --- | --- |
| STFC1 | TFC6 | $TF_{3,2}$ (320, 1) | $TF_{2,3}$ (40, 0) | $TF_{1,1}$ (32, 0) |
| STFC2 | TFC4 | $TF_{3,1}$ (320, 0) | $TF_{2,1}$ (40, 2) | $TF_{1,3}$ (32, 2) |
| STFC3 | TFC5 | $TF_{3,1}$ (320, 0) | $TF_{2,2}$ (40, 1) | $TF_{1,2}$ (32, 1) |
| STFC4 | TFC3 | $TF_{3,1}$ (320, 0) | $TF_{2,2}$ (40, 1) | $TF_{1,1}$ (32, 0) |
| STFC5 | TFC2 | $TF_{3,1}$ (320, 0) | $TF_{2,3}$ (40, 0) | $TF_{1,2}$ (32, 1) |
| STFC6 | TFC1 | $TF_{3,1}$ (320, 0) | $TF_{2,3}$ (40, 0) | $TF_{1,1}$ (32, 0) |

Next, at step 16, the TFC selection mechanism creates a sorted TF table comprising TF sorted according to the prioritized transport channels and increasing size of the associated TF and identifies only the TFC applicable to each TF of each TFS, see Table 4 below. For example, a subset of each TFS may only be relevant for each transport channel. Therefore, identification allows quick association of TF and TFC per prioritized transport channel.

TABLE 4

| TrCh3 | STF1 | $TF_{3,1}$ (320, 0) | STFC2, STFC3, STFC4, STFC5, STFC6 |
| --- | --- | --- | --- |
|  | STF2 | $TF_{3,2}$ (320, 1) | STFC1 |
| TrCh2 | STF3 | $TF_{2,3}$ (40, 0) | STFC1, STFC5, STFC6 |
|  | STF4 | $TF_{2,2}$ (40, 1) | STFC3, STFC4 |
|  | STF5 | $TF_{2,1}$ (40, 2) | STFC2 |
| TrCh1 | STF6 | $TF_{1,1}$ (32, 0) | STFC1, STFC4, STFC6 |
|  | STF7 | $TF_{1,2}$ (32, 1) | STFC3, STFC5 |
|  | STF8 | $TF_{1,3}$ (32, 2) | STFC2 |

Next, step 18, the TFC selection mechanism creates a sorted TF table comprising TF sorted according to transport channel priority and increasing minimum buffer occupancy (BO), Equation 1, with identification of associated maximum BO, Equation 2, identification of associated RLC size, and identification of TFC which use a buffer occupancy equal to or falls within the calculated minimum and maximum buffer occupancy, see Table 5 below. The RLC size is a dynamic value populated by the TFC selection mechanism according to the data unit size at a logical channel.

$$\text{Min BO} = \max(0, (n-1)*s+1) \quad \text{Eq. 1}$$

$$\text{Max BO} = n*s \quad \text{Eq. 2}$$

Where n equals the number of TB's and s is the size of each TB in bits. The formula minimizes the chance padding bits will have to be used to accommodate RLC data units not fully utilizing transport channel memory buffers.

TABLE 5

| TrCh3 | STF1 | $TF_{3,1}$ (320, 0) | (RLC Size) | Min BO 0 | Max BO 0 | STFC2,3,4,5,6 |
|---|---|---|---|---|---|---|
|  | STF2 | $TF_{3,2}$ (320, 1) | (RLC Size) | Min BO 1 | Max BO 320 | STFC1 |
| TrCh2 | STF3 | $TF_{2,3}$ (40, 0) | (RLC Size) | Min BO 0 | Max BO 0 | STFC1,5,6 |
|  | STF4 | $TF_{2,2}$ (40, 1) | (RLC Size) | Min BO 1 | Max BO 40 | STFC3,4 |
|  | STF5 | $TF_{2,1}$ (40, 2) | (RLC Size) | Min B0 41 | Max BO 80 | STFC2 |
| TrCh1 | STF6 | $TF_{1,1}$ (32, 0) | (RLC Size) | Min BO 0 | Max BO 0 | STFC1,4,6 |
|  | STF7 | $TF_{1,2}$ (32, 1) | (RLC Size) | Min BO 1 | Max BO 32 | STFC3,5 |
|  | STF8 | $TF_{1,3}$ (32, 2) | (RLC Size) | Min B0 33 | Max BO 64 | STFC2 |

Although the separate creation of Table 4 is not necessary, it allows for a more efficient construction of Table 5 at configuration time. Next, step 20, the TFC selection mechanism creates a sorted transport channel table comprising transport channels sorted according to increasing TTI with identification to the first and last sorted TF of Table 4, the selected logical channel, and the selected TF, see Table 6. Selected Lch and TF are dynamic values periodically changing.

TABLE 6

| TTI | TrCh | First STFI | Last STFI | Selected Lch | Selected STF |
|---|---|---|---|---|---|
| 2 | 2 | 3 | 5 | $Lch_z$ | $STF_{x,y}$ |
| 4 | 1 | 6 | 8 | $Lch_z$ | $STF_{x,y}$ |
| 8 | 3 | 1 | 2 | $Lch_z$ | $STF_{x,y}$ |

Next, step 22, the TFC selection mechanism creates a sorted logical channel table comprising logical channels sorted according to increasing TTI and decreasing priority with identification to RLC size restrictions and TFC comprising TF's of a transport channel that satisfy the RLC size restriction or TFC's comprising TF's of a transport channel having a zero for the TB size, see Table 7 below. Although process steps indicated creation of Table 6 before Table 7, the order of creation between the two is not necessary. Although Tables 1-7 provide illustrative value, the tables are only examples comprising a limited number of parameters in order to help facilitate explanation of the inventive aspects. In practice, these tables may comprise a much more extensive list of information and values.

TABLE 7

| TTI | TrCh | Lch ID | Size Restrictions STFC |
|---|---|---|---|
| 2 | 2 | 9 (PRI 2) All | STFC1,2,3,4,5,6 |
| 2 | 2 | 13 (PRI 3) 40 | STFC1,2,3,4,5,6 |
| 2 | 2 | 11 (PRI 4) 45 | STFC1,5,6 |
| 4 | 1 | 11 (PRI 8) All | STFC1,2,3,4,5,6 |
| 8 | 3 | 14 (PRI 1) All | STFC1,2,3,4,5,6 |

The process steps of FIG. 1A are procedural steps for constructing tables at configuration time to be used when data units at logical channels are available for transport channel multiplexing. FIG. 1B illustrates the procedural steps involved in utilizing the sorted tables to efficiently select an appropriate TFC within a TTI of a transmission frame. At step 32, the TFC selection mechanism checks Table 6 to determine if any transport channels have a TTI starting at the current Connection Frame Number (CFN). For each transport channel identified, TFC selection must be performed. If there is more than one transport channel having a corresponding TTI, the TFC selection mechanism process the highest priority channel first. Next, step 34, the TFC selection mechanism determines which logical channels associated with the selected transport channel have data for transmission. If there is more than one logical channel, the TFC selection mechanism selects the highest priority logical channel and populates the selected logical channel field in Table 6. Next, step 36, once a transport channel with a compatible TTI is selected; the TFC selection mechanism queries Table 7 to select the STFC that do not exceed RLC size restrictions. At step 38, with the logical and transport channel identification, TTI, and STFC not exceeding RLC size restrictions, the TFC selection mechanism queries Table 5 and compares buffer occupancy of the data associated with the selected logical channel with the minimum and maximum buffer occupancy of each TF associated with the identified transport channel in order to identify from the remaining STFC those that meet the BO requirements. Next, step 40, the TFC selection mechanism eliminates STFC having incompatible TF's. The TFC selection mechanism determines which transport channels are currently in use and which are not in use and according to this information the TFC selection mechanism eliminates any STFC having incompatible TF's. In other words, for each of the transport channels associated with the current TTI or for each of the transport channels sending data at the current TTI, the TFC selection mechanism may eliminate TFC having incompatible TF sizes. In addition, the TFC selection mechanism may eliminate any STFC having TF's incompatible with transport channels not having data available during a TTI. Of the STFC identified, the TFC selection mechanism selects the highest priority STFC and populates the selected STF field of table 6 with the STF of the selected STFC. At step 42, the TFC selection mechanism identifies the TF of Table 4 of the selected STF from Table 5 and compares the power requirements of the TF with the power available for the current transmission frame in order to determine if transmission of the selection is possible. If transmission is possible, the TFC associated with the selected STFC is identified in Table 3 and provided to the MAC to multiplex the logical channel carrying the data onto the appropriate transport channel. If the power control level is not suitable for the current TFC, then the next highest priority STFC from the remaining STFC is selected. The selected STFC is retained for a period of time in order to determine compatibility of TFC in process step 40.

Figure 2:
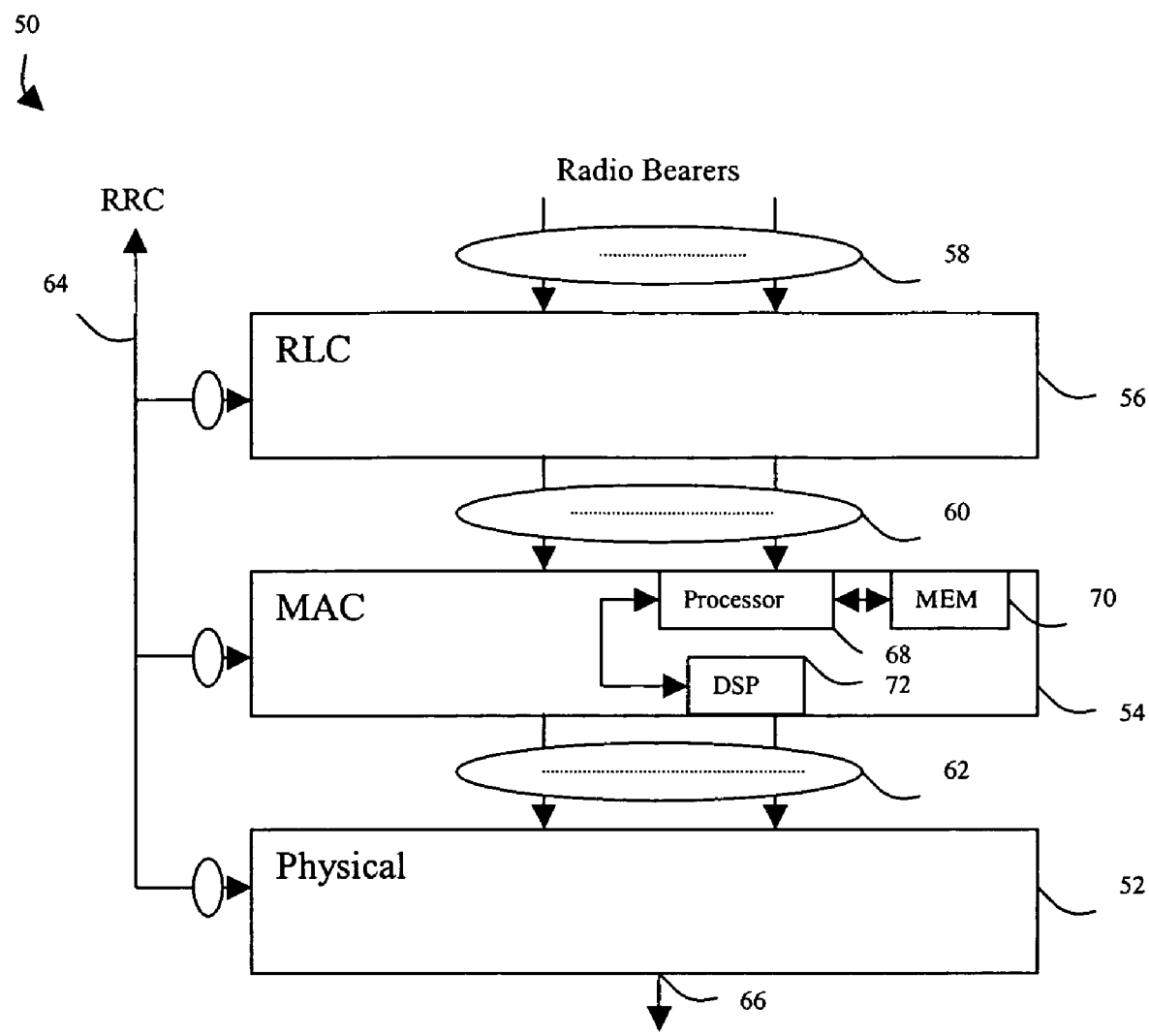
FIG. 2 illustrates elements of a link layer mechanism relevant to an embodiment of the invention used in wireless networking equipment utilizing a MAC mechanism incorporating the TFC selection mechanism.

Referring now to FIG. 2, illustrated are elements of a link layer mechanism relevant to an embodiment of the invention used in wireless networking equipment utilizing a MAC mechanism incorporating the TFC selection mechanism denoted generally as 50. Link layer mechanism 50 comprises a physical layer mechanism 52, a Medium Access Control (MAC) mechanism 54, a Radio Link Control (RLC) mechanism 56, Radio Bearers (RB) 58, logical channels 60, transport channels 62, control channels 64, and a physical channel 66. Physical layer mechanism 52 provides transport channels to MAC 54 and codes TBs present on the transport channels into frames to be transmitted over physical channel 52. MAC 54 comprises a microprocessor 68, memory 70, and Digital Signal Processor (DSP) 72 for providing logical channels 60 to RLC mechanism 56, receiving configuration tables from a Radio Resource Control (RRC) mechanism over control channels 64, prioritizing the transport channels, sorting the tables according to the process steps identified in FIG. 1A, and multiplexing logical channels 60 onto transport channels using TFC selected according to the process identified in FIG. 1B. RLC mechanism 56 provides RB's 58 for control and user plane data, process control functions, and mapping of data onto logical channels. MAC 54 comprises the resources necessary to execute the TFC selection mechanism as illustrated and described in reference to FIGS. 1A and 1B. MAC 54 comprises several functions responsible for multiplexing data present on logical channels onto a composite of transport channels, referred to in the industry as a Coded Composite Transport Channel (CCTrCh) to be transmitted over a dedicated physical channel within a TTI. However, the various functions outside of the TFC selection mechanism are well known to persons of skill in the art and therefore for the sake of clarity with respect to novelty of the invention will not be recited here.

Figure 3:
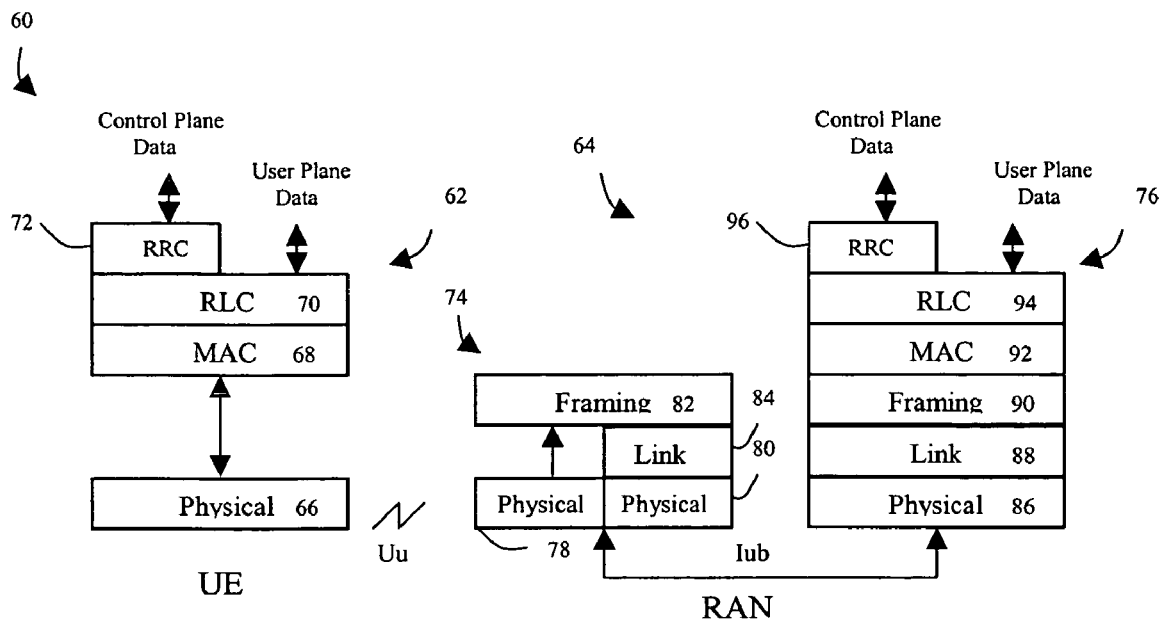
FIG. 3 illustrates an exemplary embodiment of a protocol structure of a UMTS wireless network utilizing the TFC selection mechanism.

Referring now to FIG. 3, illustrated is a UMTS wireless protocol structure for the interface between a User Equipment (UE) and a Radio Access Network (RAN), where the TFC selection mechanism utilized in conjunction with a MAC processing mechanism may be utilized to improve processing efficiencies, denoted generally as 60. Protocol structure 60 comprises a User Equipment (UE) protocol stack 62 and a Radio Access Network (RAN) protocol stack 64. The UE protocol stack 62 comprises a physical layer 66, a MAC layer 68, a RLC layer 70, and a RRC layer 72 for providing radio access over a Uu interface to control and user plane data. Upper layer protocols managing control plane data may be, for example, Mobility Management (MM) and Session Management (SM) protocols, and upper layer protocols managing user plane data may be, for example, IP and TCP. However, since the details of these layers are not germane to the essence of the invention, the specific details of such have been excluded for the sake of clarity. The RAN protocol stack 64 may include a base transceiver station protocol stack 74 and a radio network controller protocol stack 76. The base transceiver station protocol stack 74 comprises a physical layer 78, 80 for processing modulated radio channels according to the UMTS standard for the Uu interface and processing data signals according to the UMTS standard for an Iub interface. The base transceiver station protocol stack 64 further comprises a framing protocol 82 for framing data according to the Iub interface, a link layer protocol 84, such as an Asynchronous Transfer Mode and an ATM adaptation layer (AAL) protocol, for multiplexing data onto the physical layer 80. The radio network controller protocol stack 76 may also comprise a physical layer 86, a link layer 88, and a framing protocol layer 90, for interfacing over the Iub interface to the base transceiver station. The radio network controller protocol stack 76 may further comprises a MAC layer 92, an RLC layer 94, and a RRC layer 96 for processing control and user plane data for communication between the UE and the radio network controller. Specific details of the various protocol layers, with the exception of the improvements of processing efficiencies provided by the TFC selection mechanism utilized in connection with MAC layer 68, 92 can be found within relevant 3G standards documentation and therefore will not be recited here. The TFC selection mechanism as described with reference to FIGS. 1A, 1B, and 2 may be utilized in connection with MAC layer 68 and 92 so that upon receipt of a configuration table the TFC selection mechanism prioritizes and sorts table information as described with reference to FIG. 1A and upon determining the presence of data units at logical channels efficiently selects a transport format combination using the sorted tables as described in FIG. 1B.

Figure 4:
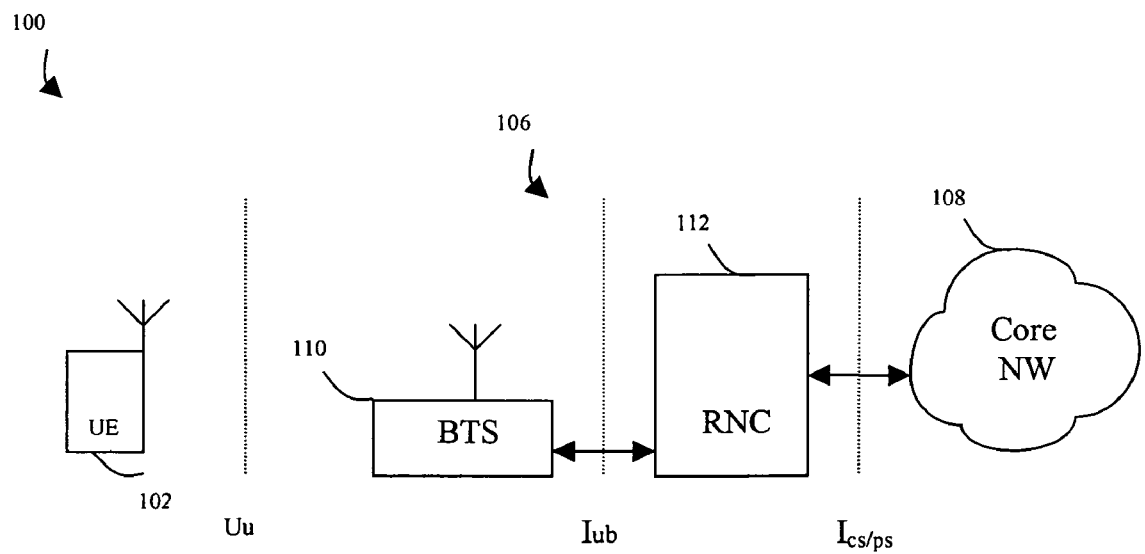
FIG. 4 illustrates an exemplary embodiment of a UMTS wireless network incorporating protocol structure of FIG. 3 utilizing the TFC selection mechanism.

Referring now to FIG. 4, illustrated is an UMTS wireless network, where the TFC selection mechanism utilized within MAC processing mechanism may be embodied to improve processing efficiencies, denoted generally as 100. Wireless network 100 comprises a User Equipment (UE) 102, a RAN 106 and a core network 108 for providing communications to and from a Packet Data Switched Network (PDSN) and Public Switched Telephone Network (PSTN). UE 102 may be a communications device for providing access to voice and data services over a Uu air interface to the RAN 106. The RAN includes a BTS 110 for processing radio channels over the Uu air interface and data channels over the Iub interface and a RNC 112 for processing data channels over the Iub interface and circuit switched and packet switched data channels over the Ics/ps interface. Although the illustration only includes one BTS and one RNC, in practice the RNC may support multiple BTS and core networks may support multiple RNC's. The TFC selection mechanism as described in references to FIGS. 1A, 1B and 2 utilized within a MAC processing mechanism may be implemented within both the UE 102 and RNC 112 or as a stand alone mechanism within either UE 102 or RNC 120. Implementation of TFC selection mechanism within a MAC processing mechanism may provide greater advantages when implemented within UE 102. The TFC selection mechanism upon receipt of configuration tables, through session initialization or data rate updates, prioritizes the transport channels and sorts the tables as specified in FIG. 1A. Upon determining the presence of data units at logical channels provided to the RLC by the MAC mechanism, the TFC selection mechanism determines the transport format combination according to the procedures identified with reference to FIG. 1B.

Although the structure and features of the 3G UMTS protocol structure and network of FIGS. 3 and 4 respectively, outside of the TFC selection mechanism as described with reference to FIGS. 1A, 1B and 2, are well known to those skilled in the particular art, the TFC selection mechanisms embodiment within this particular structure is not intended to be an implementation limitation since the TFC selection mechanism may be utilized in any protocol structure and network using a MAC processing mechanism multiplexing logical channels onto transport channels as described above.

While the use and implementation of particular embodiments of the present invention are presented in detail below, it will be understood that the present invention provides many inventive concepts, which can be embodied in a wide variety of contexts. The specific embodiments discussed herein are mere illustrations of specific ways for making and using the invention and are not intended to limit the scope of the invention.

The invention claimed is:

1. A method, operable in a wireless user equipment (UE) device, of selecting a transport format combination in a Medium Access Control mechanism for multiplexing data units between logical channels and transport channels and receiving a configuration table comprising information identifying at least one logical channel, logical channel prioritization, size restrictions of logical channel data, at least one transport channel having association with the at least one logical channel, a transmission time interval associated with each of the transport channels, and a transport format combination set comprising at least one transport format combination wherein each transport format combination comprises a transport format for each transport channel, the method comprising:

upon receiving the configuration table, prioritizing each transport channel according to the priority of the associated logical channel and sorting the at least one transport format to form at least one sorted data structure according to priority of the transport channels and a minimum buffer occupancy of each transport format associated with each transport channel, wherein each sorted transport format has associated therewith a maximum buffer occupancy, and at least one transport format combination which use a transport format of a size equal to or less than a maximum buffer occupancy associated with the transport format;

selecting, for a current connection frame number, at least one transport channel having a corresponding transmission time interval;

selecting, for each transport channel selected, a logical channel having data available for transmission; and selecting a transport format combination using said at least one sorted data structure by comparing, for each transport channel selected, the size of the selected logical channel with the minimum and maximum buffer occupancy of each sorted transport format associated with a transport channel, wherein each sorted transport format has associated therewith at least one transport format combination identified as not exceeding logical channel size restrictions so that a transport format combination having at least one transport format of the most compatible size is selected.

2. The method of selecting a transport format combination as recited in claim 1 further comprising, upon receiving the configuration table, sorting the transport format combinations of the transport format combination set according to the priority of the transport channel and the size of the transport format associated with each transport format combination.

3. The method of selecting a transport format combination as recited in claim 1 further comprising, upon receiving the configuration table, sorting the transport formats associated with the transport format set according to priority of the transport channel and size of the transport formats with identification associated therewith to transport format combinations comprising the transport format.

4. The method of selecting a Transport format combination as recited in claim 1 further comprising, upon receiving the configuration table, sorting transport channels according to increasing transmission time interval.

5. The method of selecting a transport format combination as recited in claim 1 further comprising, upon receiving the configuration table, sorting the logical channels according to transmission time interval and priority of each logical channel.

6. The method of selecting a transport format combination as recited in claim 5 further comprising identifying at least one sorted transport format combinations not exceeding the logical channel size restrictions.

7. The method of selecting a transport format combination as recited in claim 1 further comprising eliminating transport format combinations comprising incompatible transport formats.

8. A mechanism at a node in a wireless communication network for selecting a transport format combination, the mechanism receiving a configuration table comprising information identifying at least one logical channel, logical channel prioritization, size restrictions of logical channel data, at least one transport channel having association with the at least one logical channel, a transmission time interval associated with each of the transport channels, and a transport format combination set comprising at least one transport format combination wherein each transport format combination comprises a transport format for each transport channel, wherein the mechanism comprises:

a first processing mechanism that upon receiving the configuration table creates at least one sorted data structure by prioritizing each transport channel according to the priority of the associated at least one logical channel and sorts the at least one transport format according to priority of the transport channels and a minimum buffer occupancy of each transport format associated with each transport channel, wherein each sorted transport format has associated therewith a maximum buffer occupancy and at least one transport format combination which use a transport format of a size equal to or less than a maximum buffer occupancy associated with the transport format; and a second processing mechanism that upon determining the presence of data having a logical channel size at a logical channel selects a transport format combination using the at least one sorted data structure by comparing, for each transport channel selected, the size of a selected logical channel with the minimum and maximum buffer occupancy of each sorted transport format associated with a transport channel, wherein each sorted transport format has associated therewith at least one transport format combination identified as not exceeding logical channel size restrictions so that a transport format combination having at least one transport format of the most compatible size is selected.

9. The mechanism for selecting a transport format as recited in claim 8 wherein the first processing mechanism sorts the transport format combinations of the transport format combination set according to the priority of the transport channel and the size of the transport format associated with each transport format combination.

10. The mechanism for selecting a transport format as recited in claim 9 wherein the at least one transport format combination which use a transport format of a size equal to or less than a maximum buffer occupancy associated with the transport format is a sorted transport format combination sorted according to the priority of the transport channel and size of the transport format.

11. The mechanism for selecting a transport format as recited in claim 8 wherein the first processing mechanism sorts the transport formats associated with the transport format set according to priority of the transport channel and size of the transport formats with identification associated therewith to transport format combinations comprising the transport format.

12. The mechanism for selecting a transport format as recited in claim 8 wherein the first processing mechanism sorts transport channels according to increasing transmission time interval.

13. The mechanism for selecting a transport format as recited in claim 8 wherein the first processing mechanism sorts the logical channels according to transmission time interval and priority of each logical channel.

14. The mechanism for selecting a transport format as recited in claim 13 wherein the second processing mechanism identifies at least one sorted transport format combination not exceeding the logical channel size restrictions.

15. The mechanism for selecting a transport format as recited in claim 8 wherein the second processing mechanism eliminates sorted transport format combinations comprising incompatible transport formats.

16. A method of selecting a transport format combination in a Medium Access Control mechanism of a node in a wireless communication network, the method comprising:
- prioritizing each transport channel according to the highest priority of one or more associated logical channels;
- creating a first data structure of sorted transport formats associated with the plurality of transport channels, wherein each transport format is further associated with a minimum and maximum buffer occupancy and with at least one transport format combination;
- creating a second data structure containing logical channels and sorted transport format combinations that are compatible with associated size restrictions;
- for a current connection frame number, selecting at least one transport channel having a corresponding transmission time interval; and
- for each selected transport channel, selecting an associated logical channel that has the highest priority of those associated logical channels having data available for transmission and using said second data structure to determine at least one transport format combination that is not incompatible with Radio Link Control (RLC) size restrictions,
- wherein said prioritizing and said creating of said first and second data structures are performed responsive to receiving a configuration table identifying a plurality of logical channels, logical channel prioritization, and a plurality of transport channels that are each associated with one or more of said plurality of logical channels.

17. The method as recited in claim 16, wherein said first data structure is sorted by transport channel priority and by increasing minimum buffer occupancy.

18. The method as recited in claim 16, wherein said second data structure is sorted by increasing transmission time interval of associated transport channels and by decreasing priority of the logical channels.

19. The method as recited in claim 16, further comprising using said first data structure to compare buffer occupancy of the data associated with a selected logical channel with minimum and maximum buffer occupancy of each transport format associated with the associated transport channel to identify those remaining transport format combinations that meet the buffer occupancy requirements.

20. A Medium Access Control (MAC) mechanism in a user equipment (UE) device, the MAC mechanism comprising:
- means for receiving data over a plurality of logical channels from a Radio Link Control (RLC) mechanism;
- means for providing said data over a plurality of transport channels to be multiplexed over a physical layer mechanism, each transport channel associated with at least one of said plurality of logical channels;
- means for prioritizing each transport channel according to the highest priority of said at least one associated logical channels;
- means for creating a first data structure of sorted transport formats associated with the plurality of transport channels, wherein each transport format is associated with a minimum and maximum buffer occupancy and with at least one transport format combination;
- means for creating a second data structure containing logical channels and sorted transport format combinations that are not incompatible with associated size restrictions;
- means for selecting at least one transport channel having a transmission time interval corresponding to a current connection frame number; and
- means for selecting, for each selected transport channel, an associated logical channel that has the highest priority of those associated logical channels having data available for transmission and for using said second data structure to determine at least one sorted transport format combination that is not incompatible with RLC size restrictions,
- wherein said means for prioritizing, said means for creating a first data structure and said means for creating a second data structure are active responsive to said MAC mechanism receiving a configuration table identifying a plurality of logical channels, logical channel prioritization, and a plurality of transport channels that are each associated with one or more of said plurality of logical channels.

21. The MAC mechanism in a UE device as recited in claim 20, further comprising means for using said first data structure to compare buffer occupancy of the data associated with a selected logical channel with minimum and maximum buffer occupancy of each transport format associated with the associated transport channel to identify those remaining transport format combinations that meet the buffer occupancy requirements.

22. A Medium Access Control (MAC) method operable in a user eguipment (UE) device, the method comprising:
- receiving data over a plurality of logical channels from a Radio Link Control (RLC) mechanism;
- providing said data over a plurality of transport channels to be multiplexed over a physical layer mechanism, each transport channel associated with at least one of said plurality of logical channels;
- prioritizing each transport channel according to the highest priority of said at least one associated logical channels;
- creating a first data structure of sorted transport formats associated with the plurality of transport channels, wherein each transport format is associated with a minimum and maximum buffer occupancy and with at least one transport format combination;
- creating a second data structure containing logical channels and sorted transport format combinations that are not incompatible with associated size restrictions;
- selecting at least one transport channel having a transmission time interval corresponding to a current connection frame number; and
- selecting, for each selected transport channel, an associated logical channel that has the highest priority of those associated logical channels having data available for transmission and using said second data structure to determine at least one transport format combination that is not incompatible with RLC size restrictions,
- wherein said prioritizing, said creating a first data structure and said creating a second data structure are active responsive to receiving a configuration table identifying a plurality of logical channels, logical channel prioritization, and a plurality of transport channels that are each associated with one or more of said plurality of logical channels.

23. The MAC method in a UE device as recited in claim 22, further comprising using said first data structure to compare buffer occupancy of the data associated with a selected logical channel with minimum and maximum buffer occupancy of each transport format associated with the associated transport channel to identify those remaining transport format combinations that meet the buffer occupancy requirements.

* * * * *

UNITED STATES PATENT AND TRADEMARK OFFICE
CERTIFICATE OF CORRECTION

PATENT NO. : 7,630,316 B2  Page 1 of 1
APPLICATION NO. : 11/026456
DATED : December 8, 2009
INVENTOR(S) : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Second Day of November, 2010

David J. Kappos
*Director of the United States Patent and Trademark Office*